J. GRAHAM.
Detaching Horses.
No. 42,574. Patented May 3, 1864.
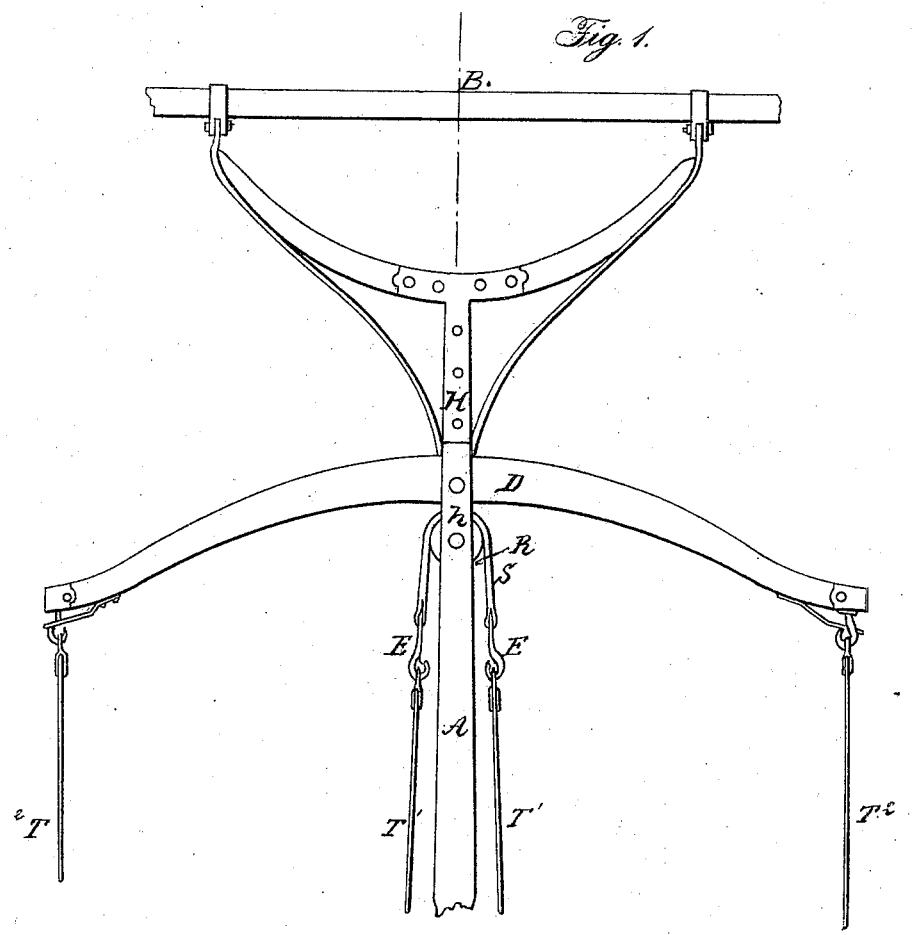
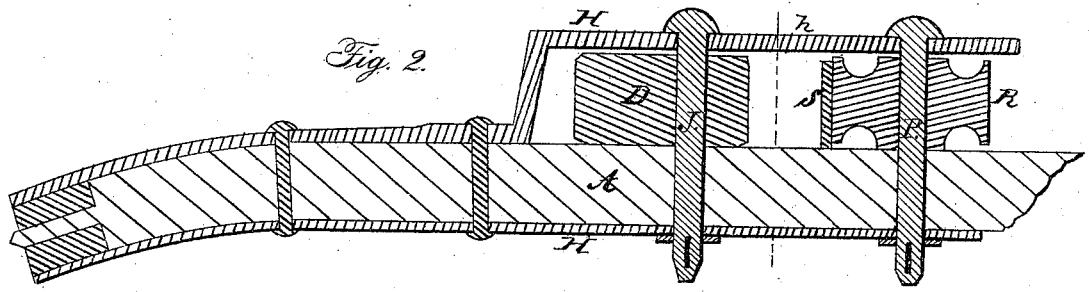
Witnesses:
George Johnson.
Joel E. Giles
Inventor:
John Graham

UNITED STATES PATENT OFFICE.

JOHN GRAHAM, OF CERESCO, MICHIGAN.

HITCHING HORSES TO VEHICLES AND PLOWS.

Specification forming part of Letters Patent No. 42,574, dated May 3, 1864.

*To all whom it may concern:*

Be it known that I, JOHN GRAHAM, of Ceresco, in the county of Calhoun and State of Michigan, have invented a new and Improved Mode of Hitching Horses to Vehicles or Plows; and I do hereby declare that the following is a full, true, and exact description of the same, reference being had to the annexed drawings, making a part of this specification, in which—

Figure 1 is a plan view. Fig. 2 is a vertical section in the line $x$.

Similar letters of reference in both figures indicate like parts.

My invention only applies to two horse vehicles; and it consists in dispensing entirely with the ordinary "whiffletrees" and hooking the outer "traces" to the end of a modified "double-tree" or "equalizer," and in connecting the inner traces with the ends of a short leather strap, which passes half round a vertical roller on the "tongue" or pole of the carriage or wagon; and the better to enable others to construct and use my invention, I will now proceed to more particularly describe it.

By reference to Fig. 1 it will be seen that to apply my invention no change is required in the form or construction of the carriage pole or tongue A, or its attachments or connection with the axle B. The upper and lower "hammer-straps," H H, are required to be longer than ordinary, being elongated beyond the line $h$ for the purpose of receiving the pin P of an "evener-roller," R, which I usually construct of cast-iron chambered out, so as to make it as light as possible. The evener-roller R should be bored out and trued externally in the lathe, as well as the pin P, with plenty of freedom to revolve around it, and it is well to make the pin with a square neck and to make a corresponding hole in the upper strap, so as to hold it stationary.

S represents what I term the "evener-strap," which passes half round the roller R, and to each end of which I attach a spring-hook, E, to which the inside traces or "tugs," T' T', are hitched. The strap S may be made of leather or any other material sufficiently strong, durable, and somewhat elastic.

D represents the double-tree, to the ends of which I attach the outer traces or tugs, $T^2$ $T^2$, substantially in the same manner as they are usually attached to the common whiffletree. It is connected with the tongue A and hammer-straps H H by the swivel-bolt J in the ordinary way.

It will be seen by reference to Fig. 1 that to equalize the length of the traces in that arrangement the double-tree D is required to be curved, which I accomplish by sometimes steaming and bending it to the required form or by selecting a natural crook in the wood. I do not wish, however, to confine myself to placing the evener-roller forward of the double-tree so as to require any curvature, for in the case of wagons, where economy and strength are more important than the beauty of curved lines, the double-tree may be left straight and the evener arrangement placed behind by a proper modification of the strap to receive the roller. In plowing or analogous uses this mode of attachment will require a special elongated "clevis" to receive the roller and strap.

The mode of operation is as follows: As the double-tree vibrates or swings round by an unequal pulling of the horses, the evener-strap S will revolve the roller R partially and accommodate itself to every new requirement, lengthening and shortening on either side as occasion demands, and conferring a uniformity of strain unsurpassed by the use of the single or whiffletrees, while the arrangement generally is more simple, elegant, and free from collisions with the tongue and wheels, as well as more economical, safe, and durable.

I claim—

The employment of the modified double-tree D, in combination with the hitching-strap S and roller R, arranged and operated substantially as and for the purpose herein specified.

JOHN GRAHAM.

Witnesses:
GEORGE JOHNSON,
JOEL E. GILES.